United States Patent
Maceri et al.

(10) Patent No.: US 8,186,735 B2
(45) Date of Patent: May 29, 2012

(54) MODULAR VEHICLE FLOOR SYSTEM

(75) Inventors: Alexander J. Maceri, Sterling Heights, MI (US); Eberhard Krueger, Jr., Clarkston, MI (US); Mark A. Rice, Garden City, MI (US); Christina H. Van Agen, Rochester, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 332 days.

(21) Appl. No.: 12/489,668

(22) Filed: Jun. 23, 2009

(65) Prior Publication Data

US 2010/0320794 A1    Dec. 23, 2010

(51) Int. Cl.
*B60R 7/04* (2006.01)

(52) U.S. Cl. ............... 296/37.14; 280/783; 296/37.8; 296/37.15; 296/97.23; 296/193.07

(58) Field of Classification Search ............... 180/68.5; 280/783; 296/37.1, 37.8, 37.14, 37.15, 97.23, 296/193.07; 297/188.08, 188.13
See application file for complete search history.

(56) References Cited

U.S. PATENT DOCUMENTS

| | | | | |
|---|---|---|---|---|
| 3,401,975 A * | 9/1968 | Oger | | 296/97.23 |
| 4,398,765 A * | 8/1983 | Ishikawa | | 296/37.2 |
| 4,801,169 A * | 1/1989 | Queen et al. | | 296/39.1 |
| 5,167,433 A * | 12/1992 | Ryan | | 296/37.1 |
| 5,474,829 A * | 12/1995 | Woosley | | 428/88 |
| 5,573,294 A * | 11/1996 | Mack | | 296/97.23 |
| 5,979,962 A * | 11/1999 | Valentin et al. | | 296/37.1 |
| 6,017,074 A * | 1/2000 | Biskup | | 296/39.1 |
| 6,145,907 A * | 11/2000 | Maruyama et al. | | 296/37.14 |
| 6,216,811 B1 * | 4/2001 | Herc | | 180/68.5 |
| 6,247,741 B1 * | 6/2001 | Seel et al. | | 296/37.14 |
| 6,491,999 B1 * | 12/2002 | Cawthra et al. | | 428/95 |
| 6,537,641 B1 * | 3/2003 | Kroll | | 428/95 |
| 6,736,442 B2 * | 5/2004 | Gebreselassie et al. | | 296/97.23 |
| 6,752,304 B1 * | 6/2004 | Hotary et al. | | 224/544 |
| 6,860,547 B2 * | 3/2005 | Winter et al. | | 296/193.02 |
| 6,945,594 B1 * | 9/2005 | Bejin et al. | | 296/193.07 |
| 7,011,352 B2 * | 3/2006 | Matsuoka et al. | | 296/37.14 |
| 7,090,274 B1 * | 8/2006 | Khan et al. | | 296/37.16 |
| 7,140,658 B2 | 11/2006 | Maceri et al. | | |
| 7,688,582 B2 * | 3/2010 | Fukazu et al. | | 361/690 |
| 2007/0138820 A1 * | 6/2007 | Hanson et al. | | 296/37.14 |
| 2008/0157567 A1 * | 7/2008 | Rashidy et al. | | 296/202 |

FOREIGN PATENT DOCUMENTS

| | | |
|---|---|---|
| DE | 4115971 A1 * | 11/1992 |
| FR | 2662404 A1 * | 11/1991 |
| GB | 2203598 A * | 10/1988 |

* cited by examiner

*Primary Examiner* — Glenn Dayoan
*Assistant Examiner* — Paul Chenevert
(74) *Attorney, Agent, or Firm* — Ralph E. Smith

(57) ABSTRACT

A modular vehicle floor system is provided that has a floor pan with integrated storage compartments. A floor is defined by a deck and compartment lids that overlie the floor pan and can provide a waterproof seal for the storage compartments. The deck and compartment lids together define a substantially flat surface that is covered by a vehicle carpet. The deck can include basket-like liners extending downwardly therefrom that nest within the storage compartments and define the inner surface(s) of usable spaces within the storage compartments. The deck includes a raceway system with one or more troughs or ports that house lengths of vehicle wiring, under the deck surface. The deck can further include flanges and/or tabs for serving as mounting substrates, against which sills and other hard trim components are mounted, allowing trim components to be mounted to the deck and not mounted directly to the vehicle body.

18 Claims, 6 Drawing Sheets

MODULAR VEHICLE FLOOR SYSTEM

FIELD

The present invention relates to motor vehicle unibody floors and more particularly to a floor system that provides storage compartments that house various electronic components such as control modules, vehicle batteries, and vehicle wiring.

BACKGROUND

Hidden or out of sight vehicle storage compartments are well known in the art. Many hidden storage compartments are used for housing electronic components or control modules in areas that are visually inconspicuous to vehicle passengers and spatially confined out of way of the vehicle passengers.

U.S. Pat. No. 7,140,658 discloses storage units that are incorporated beneath a second row of seating, for housing control modules and also serving as a tread upon which vehicle passengers in a third row of seating can place and rest their feet. Although such efforts have proven beneficial and successful for providing inconspicuous storage for the control modules, not all vehicles have second or third rows of seating, or space readily available under such seating.

Correspondingly, yet other efforts have been made to provide general storage or storage for various electronic components, control modules, and/or vehicle batteries in compartments that are recessed into floors of vehicles. The bottom and sidewalls of such recessed storage compartments are integrated into the floors during their manufacturing, such as during floor pan pressing or drawing procedures. Typically, complex false floors are used in combination with the floor pans to provide a generally flat surface for the vehicles' carpeting. Some such false floors are constructed by partially overlapping numerous carbon fiber pieces, in a shingle-like manner, which are screwed into the underlying floor pans.

Such known false floors have proven beneficial and successful for providing lightweight and generally flat surfaces that can be covered with vehicle carpeting. Although these false floors have in the past enjoyed considerable commercial success, further technological developments could prove desirable. For example, the known false floors are labor intensive to install and require a substantial amount of hardware, since each or many of the numerous carbon fiber pieces must be screwed into the underlying floor pans. Typical false floors are not robust enough to serve as mounting substrates, whereby lower hard trim pieces and other trim pieces must be attached to the floor pan or other vehicle body segment with associated brackets, clips, studs, and/or other mounting hardware. Known false floors are not waterproof, whereby any liquid that enters the vehicle or is spilled on the floor can eventually run into the recessed storage compartments. Furthermore, a typical false floor permits routing of wire harnesses and/or other conductors in a conventional manner. In other words, wire harnesses and/or other conductors in typical false floor applications are installed under pieces of trim and under carpeting, and are secured by wire mounts, zip-ties, or other wire restraints to the vehicle's floor pans. Accordingly, if repair(s) to, or trouble diagnosis of, a vehicle electronic system are needed that require accessing the electronic components, control modules, vehicle batteries, and/or wiring, then disassembling or removing numerous portions or components of the vehicle's interior, such as pieces of trim and carpeting, is required. Such disassembly or removal of vehicle interior components is commonly referred to as "de-trimming" the vehicle, which can be a time-consuming endeavor and can at times require new hardware for reinstalling or reassembling the vehicle interior components.

Accordingly, a modular vehicle floor system that reduces the number of fasteners required for installation and can suitably protect electronic components while permitting access thereto could prove beneficial.

SUMMARY

The present invention is directed to modular vehicle floor systems that can house electronic components and/or other items in a manner that permits access thereto. The module vehicle floor system includes a floor pan with integrated storage compartments. A deck and compartment lids overlie the floor pan and provide a waterproof seal for the storage compartments. The deck and compartment lids together define a substantially flat surface that can be covered by a vehicle carpet. One or more raceways can be provided in the deck for housing lengths of wiring harnesses, other conductors, or other conduits. The raceways can be waterproof and open into the storage compartments, and each raceway can include a trough that is integrated into the deck and a cap that removably overlies the trough. The deck can further include tabs for serving as mounting substrates against which sills and other hard trim components are mounted, so that the trim components are not mounted directly to the vehicle body.

Accordingly, an object of the invention is to provide a modular vehicle floor system that requires relatively few fasteners for installation and protects electronic components, for example, various ones of electronic control modules, vehicle batteries, and wire harnesses or other conductors, while leaving such electronic components readily accessible.

Another object of the invention is to provide a modular vehicle floor system having integrally formed raceways in which wire harnesses or other conductors are housed, permitting access thereto without de-trimming the vehicle.

A further object of the invention is to provide a modular vehicle floor system with waterproof compartments for housing electronic components that permits easy access for replacement, diagnosis, or maintenance.

Another object of the invention is to provide a modular vehicle floor system that provides sufficient waterproofing to allow deep water crossings or water fording capability to the vehicle.

Yet another object of the invention is to provide a modular vehicle floor system that has a multiple piece deck that overlies a floor pan, each of the multiple pieces of the deck being relatively maneuverable for an installer.

Still another object of the invention is to provide a modular vehicle floor system that includes a deck that overlies a floor pan and is configured for accepting trim mounting fasteners thereinto, such that a deck is a mounting substrate for at least some trim pieces instead of the floor pan or other body component of a vehicle.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

Figure 1:
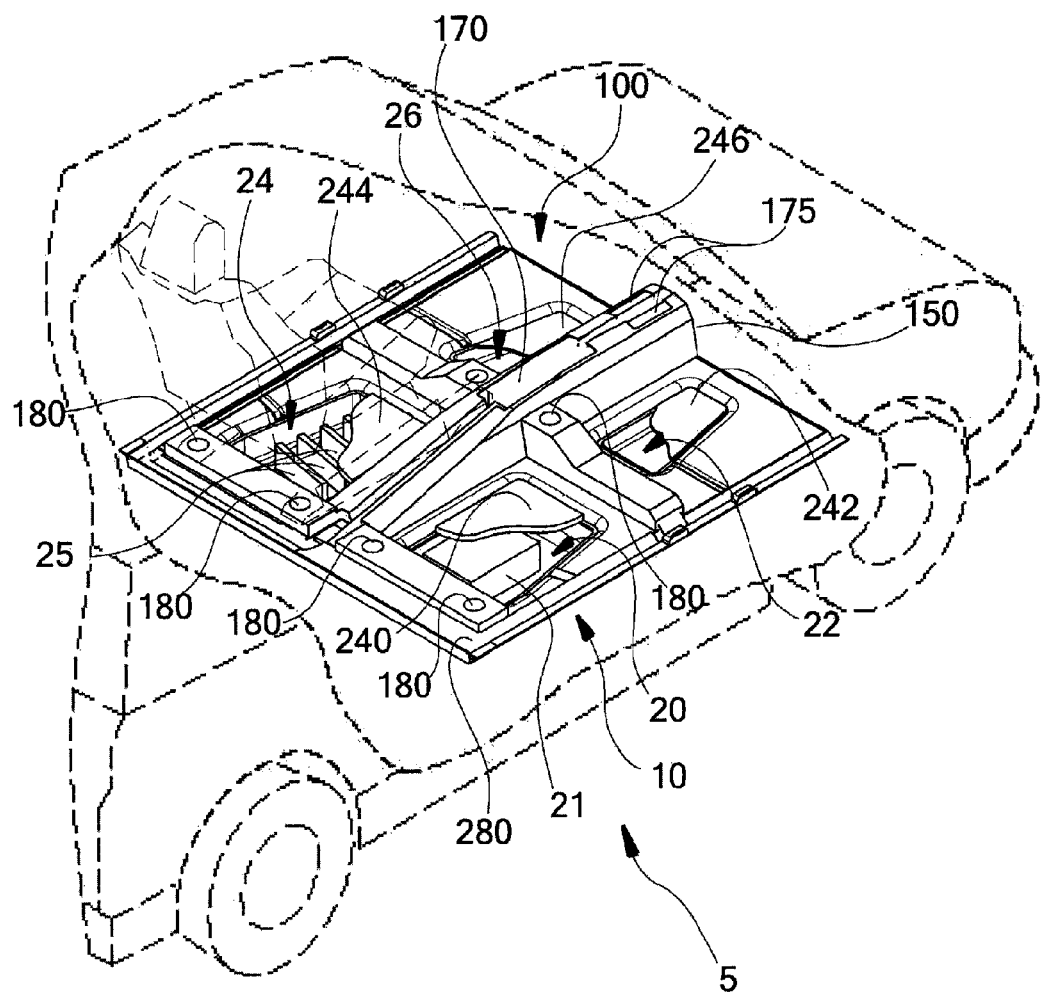
FIG. 1 is an isometric view of portions of a vehicle unibody incorporating a modular floor system according to the present invention.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIG. 1 illustrates portions of vehicle unibody and cab interior that incorporates a modular vehicle floor system 5, which includes a floor pan 10 and a deck 100. Floor pan 10 and deck 100 together provide a portion of the structural integrity for a vehicle having a unibody construction, provide mounting substrates for hard trim and other interior trim pieces, and provide a protective environment for housing various electronic components or storing personal or other items.

Figure 2:
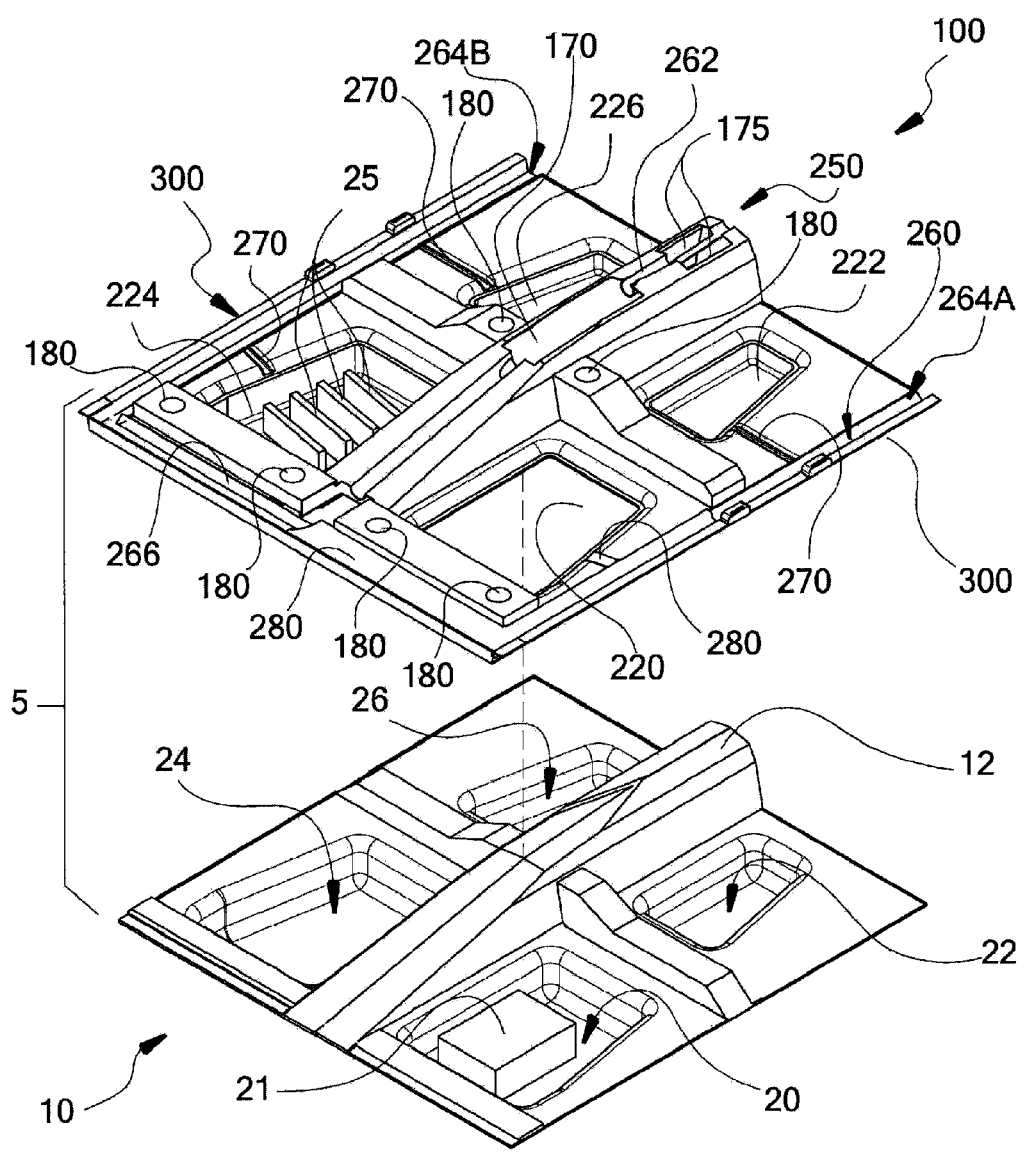
FIG. 2 is a partially exploded isometric view of the vehicle unibody and a single-piece deck according to the present invention.
Figure 3:
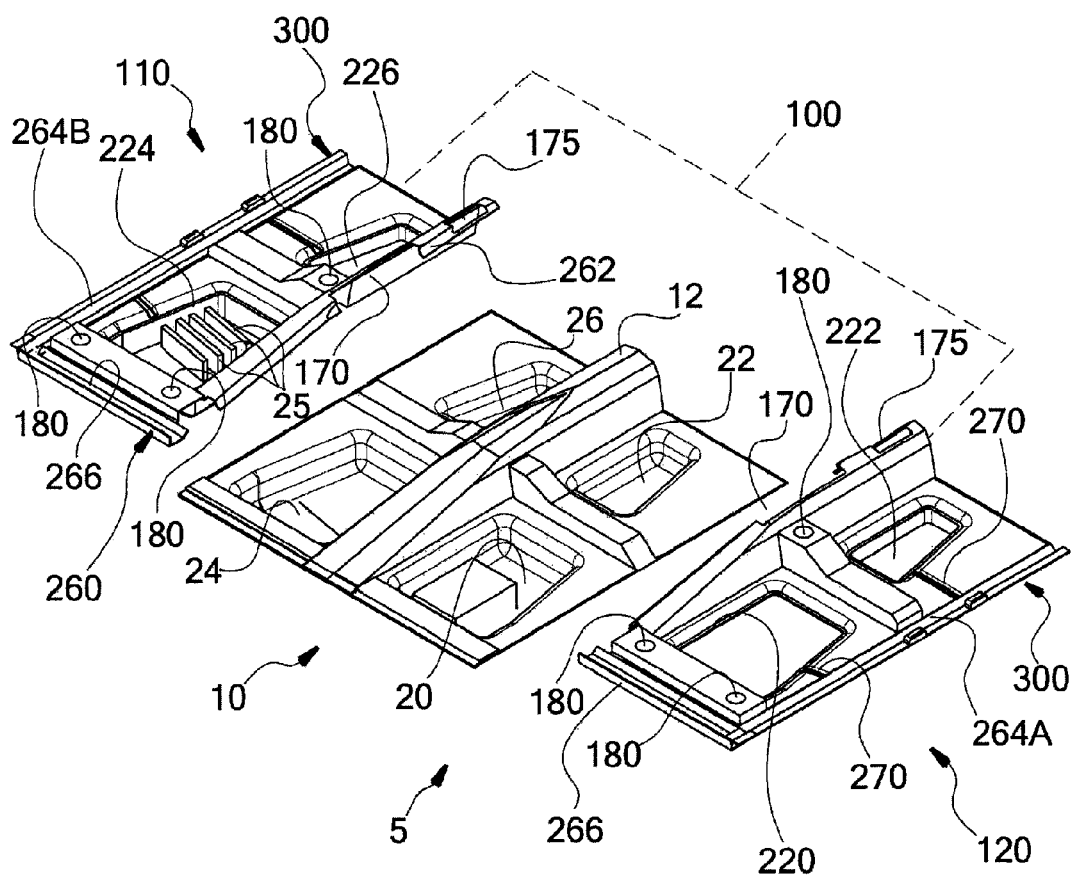
FIG. 3 is an exploded isometric view of a two-piece variant of the deck of FIG. 2.
Figure 4:
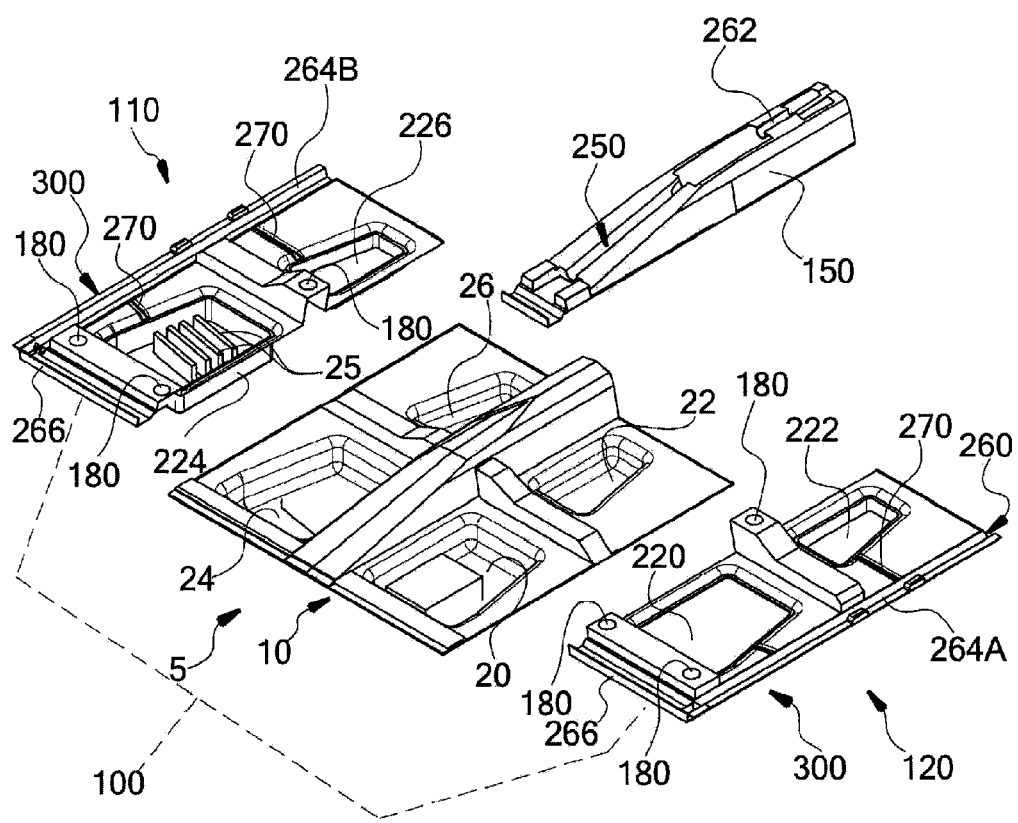
FIG. 4 is an exploded isometric view of a three-piece variant of the deck of FIG. 2.

Referring now to FIGS. 2-4, floor pan 10 is a stamped or pressed metal component that defines an underbody portion of a vehicle's unibody structure, having the requisite gussets, frame rail channels, screw bosses, and/or other structures to provide a desired amount of rigidity and other performance and structural characteristics and functionality to the unibody. A tunnel 12 extends longitudinally down a medial portion of the floor pan 10 to accommodate a transmission in rear-wheel or four-wheel drive applications or to enhance structural characteristics of front-wheel drive applications, as is known.

Still referring to FIGS. 2-4, of the four compartments, 20, 22, 24, 26, compartment 20 is configured to hold a vehicle battery 21, and correspondingly includes a battery tray or restraints (not shown). Compartment 24 is configured to hold one or more electronic components such as control modules (not shown), which operate or monitor various vehicle electronic systems. Examples of electronic control modules that can be installed in the compartments include those for an onboard vehicle entertainment system, an engine control module, a transmission control module, an occupant protection system controller, or the like. Correspondingly, compartment 24 includes multiple partition walls 25 attached to the deck 100 which are illustrated as standing upright and receive and hold the control modules in the voids or slots defined between adjacent ones of the partition walls 25. The forward most compartments 22 and 26 are configured to hold or store personal or other items either below the front seats or below the feet of vehicle occupants in the front seats.

Still referring to FIGS. 2-4, of the four compartments, 20, 22, 24, 26, compartment 20 is configured to hold a vehicle battery 21, and correspondingly includes a battery tray or restraints (not shown). Compartment 24 is configured to hold one or more electronic components such as control modules (not shown), which operate or monitor various vehicle electronic systems. Examples of electronic control modules that can be installed in the compartments include those for an onboard vehicle entertainment system, an engine control module, a transmission control module, an occupant protection system controller, or the like. Correspondingly, compartment 24 includes multiple partition walls 25 which are illustrated as standing upright and receive and hold the control modules in the voids or slots defined between adjacent ones of the partition walls 25. The forward most compartments 22 and 26 are configured to hold or store personal or other items either below the front seats or below the feet of vehicle occupants in the front seats.

Figure 5:
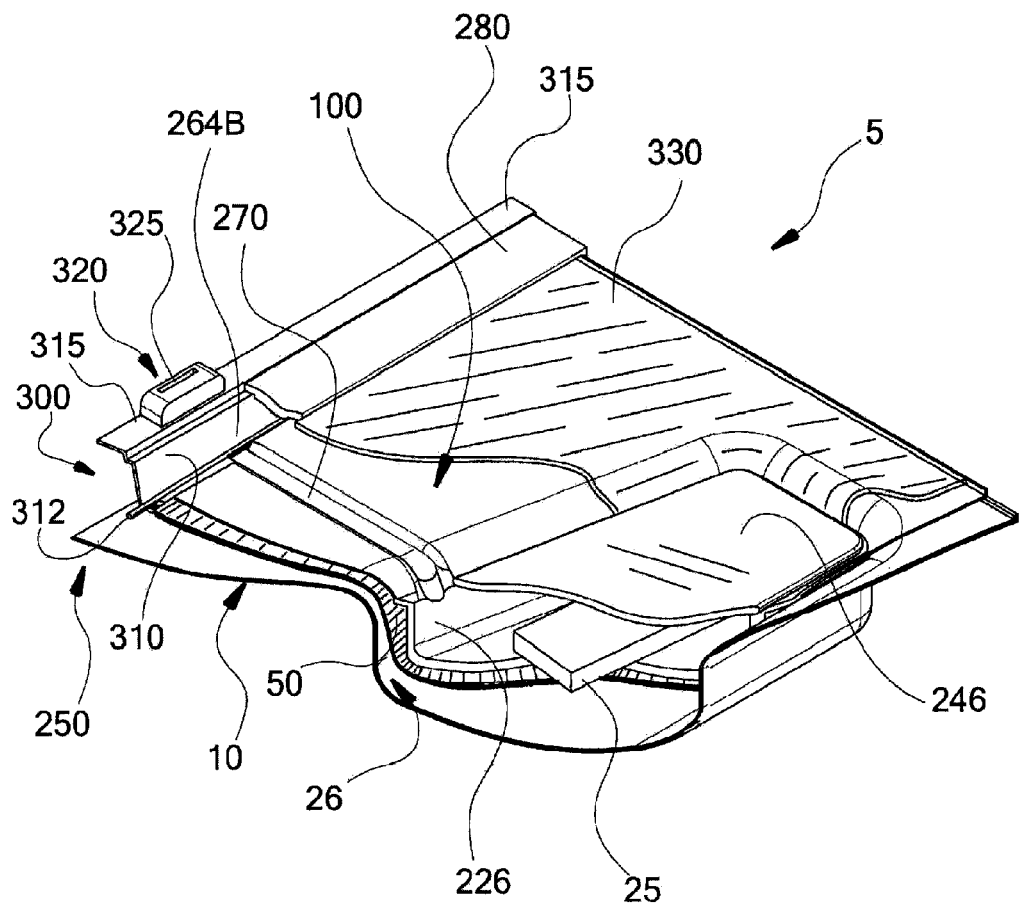
FIG. 5 is an isometric view of part of the modular floor system of FIG. 1, with portions cut away.

Referring now to FIGS. 1 and 5, besides defining part of the vehicle's structural core and defining at least portions of the compartments 20, 22, 24, 26, floor pan 10 serves as a substrate for mounting various major interior components such as the vehicle seats (FIG. 1), occupant restraint devices (not shown). Deck 100 can directly overlie the floor pan 10, in face-to-face communication, or as separated by a gap or an intermediate layer of acoustical barrier material 50 (FIG. 5), optionally a layer(s) of insulation or other materials. Acoustical barrier material 50 advantageously provides noise-vibration-harshness (NVH) reduction or dampening. Such a layer of material 50 advantageously works in concert with the deck 100 resulting in NVH reduction or dampening over just material layer 50 alone. Preferably, if there is no intervening acoustical barrier material 50 (FIG. 5) provided between the floor pan 10 and deck 100, then such material 50 is provided elsewhere as a layer within a multiple layer stack of the modular vehicle floor system 5, for example, against an upper surface of the deck 100. As best seen in FIG. 1, the deck 100 and floor pan 10 can have substantially the same perimeter shape and size whereby, like floor pan 10, deck 100 extends longitudinally between a dashboard area to a back seat area of the vehicle, and transversely between opposing side doors of the vehicle.

By now to FIGS. 1-4, deck 100 at least partially serves as one or more of, for example, a false floor, a waterproof enclosure device, a trim mounting substrate, and a wire routing and housing structure, for the vehicle in which it is incorporated. Deck 100 can be a single piece unit as seen in FIGS. 1 and 2 and can have multiple sections or main portions such as left and right segments 110 and 120 as seen in FIG. 3 and can optionally include a separate tunnel cover 150 as seen in FIG. 4. Such separate segments 110 and 120 can be connected directly to each other or can sit adjacent and abut each other, or can optionally be connected by some other component of the modular vehicle floor system 5. Respective ones of the left and right segments 110 and 120 and tunnel cover 150 can include snap-locks, tongues and grooves, or other tool-less couplers at their adjoining edges or surfaces. Such configuration speeds the assembly of the left and right segments 110 and 120 and tunnel cover 150 to each other while ensuring proper indexing and alignment therebetween, as well as ensuring proper indexing and alignment of other vehicle interior components connected thereto. Regardless of whether deck 100 is of multiple section or unitary configuration, it includes multiple holes, or apertures 170, 175, and 180 that have perimeter shapes that facilitate indexing other interior components to the deck 100, and can permit access to mounting structures such as screw bosses, brackets, or surfaces provided on an upper surface of the underlying floor pan 10. In other words, apertures 170, 175, and 180 have perimeter shapes that correspond to perimeter shapes of consoles, dashboard support brackets, feet or legs of vehicles seats, or other interior components, allowing an installer of such components to index them upon the deck 100.

For example, aperture 170 accepts a console therein so that an installer registers and aligns the console within the aperture 170 when mounting it to the vehicle. Accordingly, aperture 170 is an elongate rectangular opening that extends through an upper wall of the tunnel cover 150, along a medial portion thereof. The particular profile shape of aperture 170 corresponds to an outer profile shape of a center-mounted storage console, transmission shift lever housing, transfer case shift lever housing, or parking brake lever housing.

Apertures 175 accept part of a console or dashboard supports brackets, depending on the particular end use configuration, facilitating proper indexing of such components during vehicle assembly. The apertures 175 are rectangular, extending longitudinally, and running parallel to each other. Apertures 175 are transversely spaced from each other, straddling a centerline of the tunnel cover 150.

Apertures 180 accept feet or legs of vehicle seats therein, thereby allowing an installer to register and align the seats by indexing them with respect to apertures 180. The apertures 180 have round perimeter shapes and have diameters that are large enough to concentrically house convex seat mounting gussets that have captured nuts or screw bosses that receive the seat mounting hardware.

Referring again to FIGS. 2-4, other holes, apertures, or openings extend through deck 100, overlying respective ones of the compartments 20, 22, 24, 26, and permitting access to the void spaces or usable spaces within the compartments 20, 22, 24, 26. Such openings in deck 100 can be defined at upper perimeters of one or more liners 220, 222, 224, 226 that are recessed downwardly away from the deck 100, so that the liners 220, 222, 224, 226 actually define the compartments 20, 22, 24, 26 therein. Stated another way, when liners 220, 222, 224, 226 are implemented, the usable space of compartments 20, 22, 24, and 26 is defined by the inner surface(s) of the liners 220, 222, 224, 226 so that the floor pan 10 serves as a supportive backing structure to the liners 220, 222, 224, 226, but contents within the compartments 20, 22, 24, 26 do not physically contact the floor pan 10.

Referring now to FIG. 2, each of liners 220, 222, 224, 226 includes multiple interconnected sidewalls that extend downwardly from the deck 100 and connect to a bottom wall. Liners 220, 222, 224, 226 typically define basket-like continuous extensions of deck 100 that nest inside of the compartments 20, 22, 24, 26. Perimeter shapes of the of openings that extend into the liners 220, 222, 224, 226 and dimensions of the sidewalls and bottom walls of the liners 220, 222, 224, 226 are selected based on the intended end use of the compartments 20, 22, 24, 26.

Referring now to FIGS. 1 and 2, since compartment 20 holds vehicle battery 21, if it is desired to mount the battery 21 to the floor pan 10, liner 220 can include partial sidewalls, optionally no sidewalls, and an open bottom instead of fully covering and lining the compartment 20. Liner 224 has a depth dimension that allows the control modules to stand on edge in the voids or slots defined between adjacent ones of the partition walls 25. Liners 222 and 226, which in some embodiments are used for personal item storage, are shallower than the liner 224, each assuming a more tray-like configuration and thus being longer and wider than deep.

Regardless of the particular dimensions and shapes of the liners, 220, 222, 224, and 226 liners 220, 222, 224 and 226 preferably serve as an auxiliary protective layer or inner encapsulating layer of the respective compartments 20, 22, 24, 26. Furthermore, since deck 100 and liners 220, 222, 224, 226 are preferably made from the same material, if the deck 100 is made from a waterproof material, then liners 220, 222, 224, 226 afford waterproof characteristics to the corresponding compartments 20, 22, 24, 26.

Figure 6:
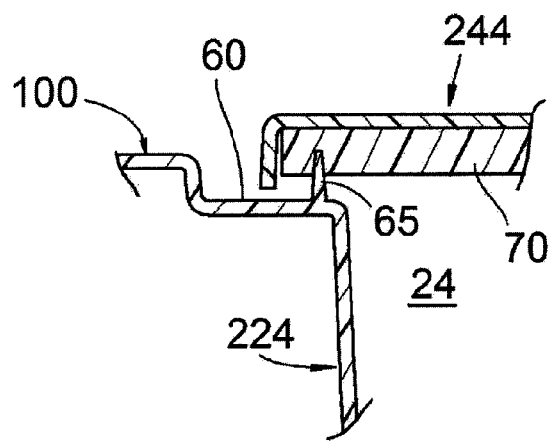
FIG. 6 is a cross section view of an interface between a lid and a compartment of the modular floor system of FIG. 1.

Referring now to FIGS. 1, 2, and 6, waterproof characteristics for the compartments 20, 22, 24, and 26 can be facilitated by a stepped-down deck or shoulder 60 (FIG. 6) that extends between the upper perimeter of liners 220, 222, 224, 226 and an upper surface of the deck 100. The shoulder 60 provides a supporting surface for lids 240, 242, 244, 246 (FIG. 1) that selectively cover the openings of liners 220, 222, 224, 226 and which can also be made of a waterproof material. Ribs 65 extend upwardly from upper surfaces of the shoulders 60. The ribs 65 extend about entire perimeters of the openings of liners 220, 222, 224, 226, noting that ribs 65 are preferably spaced slightly outwardly from the edges that define such openings of the liners 220, 222, 224, 226. When viewed in cross-section, like that shown in FIG. 6, it is apparent that each rib 65 can be tapered or wedge shaped so that it is thinner at its top than it is at its bottom where it joins with the shoulder 60. Rib 65 has a height that is at least as great as a thickness dimension of the shoulder 60, deck 100, or liner 220, 222, 224, 226, optionally 1.5 times such thickness dimension, optionally 2.0 times such thickness dimension. The tapered configuration of rib 65 allows it to penetrate into a seal material 70 that is attached to a bottom surface of a cooperating lid 240, 242, 244, 246. Preferably the seal material 70 is made from a crushable, resilient, elastomeric, polymeric, and/or other material that forms a waterproof or watertight seal between the lid 240, 242, 244, 246 and rib 65.

Yet other sealing arrangements are contemplated for creating water tight seals between the liners 220, 222, 224, 226 and lids 240, 242, 244, 246. For example, the shoulder 60 itself can provide a mounting surface upon which the seal material 70 is installed, whereby a downwardly facing outer edge of the lid 240, 242, 244, 246 engages a top surface of the seal material 70. This arrangement can also suitably provide a waterproof seal at the interface between the lids 240, 242, 244, 246 and liners 220, 222, 224, 226.

The depth of the shoulder 60 can correspond to a sum of the thickness dimension of, for example, an upper wall of the lids 240, 242, 244, 246 along with a thickness dimension of the seal material 70 when it is in a compressed or sealing state, such that the lids 240, 242, 244, 246 and upper surface of deck 100 provide a substantially flat surface upon which carpet 330 (FIG. 5) can be mounted while providing waterproof characteristics to the compartments 20, 22, 24, 26.

Waterproof characteristics of one or more of the compartments 20, 22, 24, 26 can be further facilitated by using suitable waterproof materials for deck 100 and thus liners 220, 222, 224, 226 and lids 240, 242, 244, 246. Such materials are preferably non-metallic and include any of a variety of suitable polymeric compounds such as a polyolefin or a variety thereof, and/or a variety of polyethylene, e.g., high density polyethylene, or a polypropylene. There can also be mentioned such commodity polymers as polyvinyl chloride and chlorinated polyvinyl chloride copolymers as well as a wide variety of the copolymers which embody the above-recited materials, as well as others.

Still referring to FIGS. 2-4, deck 100 includes a raceway system 250, which can be at least partially waterproof like the compartments 20, 22, 24, 26, and extends in various directions, for example, longitudinally, transversely, obliquely, and/or otherwise across the deck 100 for holding wire harnesses and/or other conductors. The raceway system 250 includes troughs 260 and ports 270 that that interconnect and provide mechanical routing structures and passageways between the compartments 20, 22, 24, 26 and/or with other components of the vehicle.

Troughs 260 collectively refer to various longitudinally extending passage ways, such as tunnel trough 262 and side troughs 264A and 264B, and transversely extending passage ways such as cross trough 266. Tunnel trough 262 extends along the length of tunnel cover 150, and is depressed into a top wall of the tunnel cover 150. As illustrated, tunnel trough 262 extends along a centerline of the tunnel cover 150, between the indexing apertures 175. Tunnel trough 262 is longitudinally split or separated into two segments by the indexing aperture 170.

Side troughs 264A and 264B extend along lateral outboard sides of the deck 100, preferably along its entire length. Side troughs 264A and 264B are transversely spaced from outer lateral segments of the liners 220, 222, 224, 226 and sit above the outer lateral portions of the floor pan 10. Cross trough 266 extends across the width of the deck 100, preferably entirely across it so that it connects rearward ends of the side troughs 264A and 264B to each other. In this configuration, when viewing the deck 100 from a top plan view, the side and cross troughs 264A, 264B and 266 collectively define a U-shaped passageway extending adjacent the deck's side edges and back edge, outside of and spaced from the compartments 20, 22, 24, 26.

Figure 7:
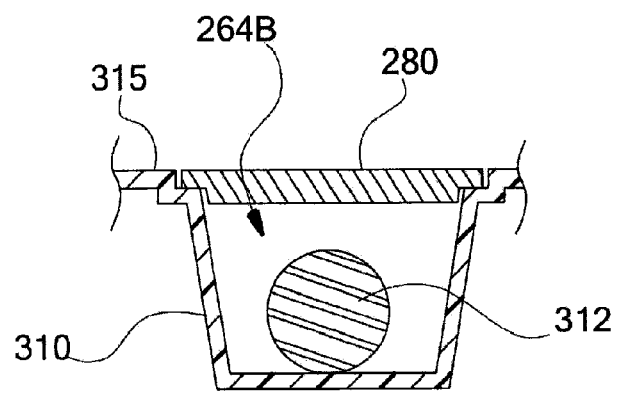
FIG. 7 is a fragmentary cross-sectional view of the wire harness raceway shown in FIG. 5.

Ports 270 extend between and connect the compartments 20, 22, 24, 26 to the side and cross troughs 264A, 264B and 266. The ports 270 allow branches, bundles of wires, or individual wires or conductors, from main wiring harnesses, e.g., wire harness 312 shown in FIGS. 5 and 7, or looms to extend from the side and cross troughs 264A, 264B and 266 to components that are housed within the 20, 22, 24, 26, without such branches, bundles of wires, or individual wires or conductors, having to be routed above the floor or upper surface of deck 100.

Troughs 260 can have bottom walls that are spaced from the underlying floor pan 10, or they can sit directly upon, for example, a sill or outboard portion of the floor pan 10. Some troughs 260 have sidewalls that converge from a relatively wider top opening to a relatively narrower bottom wall, giving the trough 260 a tapering or narrowing configuration with respect to its depth. The troughs 260 and ports 270 are channel-like in cross-section, having open tops that are selectively closed or covered by caps 280. Like the interface between the compartments 20, 22, 24, 26 of liners 220, 222, 224, 226 and lids 240, 242, 244, 246, waterproof seals can be provided between the caps 280 and troughs 260 and/or ports 270.

Elongate caps 280 are configured to snap fit over or otherwise close the top openings of the troughs 260 and ports 270, whereby individual caps has dimensions and shapes that correspond to the particular trough 260 or ports 270 to which they attach. It is noted that in typical implementations, ports 270 are smaller than the various troughs 260, in most or all dimensions, whereby caps 280 that cover troughs 260 are larger than those cover ports 270. Optionally, caps 280 that cover ports 270 are integrated into the caps 280 that cover the troughs 260, defining segments that extend perpendicularly from the elongate trough covering portions of the caps 280.

Referring now to FIG. 5, flanges 300 are positioned transversely beyond corresponding side troughs 264A, 264B with wire harness 312 shown in FIG. 5 received in trough 264B and extend longitudinally along lateral or outboard edges of the deck 100. The flanges 300 are configured as mounting substrates for mounting trim or other components to the deck 100. For example, pieces of hard trim, like sill covers or others components, are fastened to portions of the flanges 300 in lieu of being fastened directly to the floor pan 10 or other vehicle body component.

Still referring to FIG. 5, flanges 300 have L-shaped configurations that are defined by adjoining upright and horizontal segments 310 and 315, respectively. Upright segment 310 extends upwardly from an outer edge of the deck 100. Horizontal segment 315 extends outwardly from an upper edge of the upright segment so that it cantilevers out beyond the remainder of the deck 100. In the complete assemblage, the horizontal segment 315 abuts an outer edge of a cap 280 covering corresponding side troughs 264A, 264B. Preferably, the cap 280 and horizontal segment 315 are substantially coplanar (FIG. 7), providing a flat surface for vehicle carpeting 330 to lie upon (FIG. 5).

Mounting tabs 320 are provided on the flanges 300, namely, along the length of the horizontal segment 315. Adjacent mounting tabs 320 are spaced from each other and the tabs 320, and they are raised with respect to an upper surface of the horizontal segment 315. This gives the horizontal segment 315 an alternating or discontinuous height along its length. Elongate slots 325 extend entirely through and longitudinally along the mounting tabs, and are configured to receive fasteners therein for mounting the trim pieces to the flange 300.

In light of the above, to install the modular vehicle floor system 5, floor pan 10 is fixtured and connected to other portions of the vehicle body. The deck 100 can be installed after a complete assemblage of the unibody frame and vehicle body shell. Deck 100 is placed over the floor pan 10 either as a unit or in multiple components, depending on the particular end use configuration of the deck 100. As dictated by the vehicle final design, a layer of acoustical barrier material 50 may be placed over the floor pan 10 before the deck 100 is introduced. Deck 100 is secured to the floor pan 10 with suitable fasteners at various places along its perimeter and/or interior, as dictated by the particular end-use configuration. Electronic components are installed in respective ones of the compartments 20, 22, 24, 26 and wire harnesses or other conductors are connected to the electronic components and placed within the troughs 260 and port 270 of raceway system 250. Seal assemblies are installed on the caps 280 and lids 240, 242, 244, 246, or upon shoulders that are recessed down from the upper surface of the deck 100. The caps 280 and lids 240, 242, 244, 246 are snap-fit or otherwise removably attached to the deck 100, creating the waterproof enclosures of some or all of compartments 20, 22, 24, 26.

It is noted that by utilizing such large modular floor pieces of deck 100, a false floor can be assembled and/or installed in an expedited manner since fewer piece-parts are required. A major portion of a vehicle's interior floor, for example, greater than twenty five percent or greater than fifty-percent of a surface area of the vehicle's interior cabin floor pan, can be covered with a deck 100 which preferably has three or fewer primary components or main portions, such as left and right segments 110 and 120 and tunnel cover 150 (FIG. 3). The relatively few components of modular vehicle floor system 5 facilitates rapid assembly by requiring relatively few assembly steps, since a number of requisite assembly steps during a manufacturing procedure is typically influenced, at least in part, by the number of components or piece-parts that are used to create an assembly or end product.

Besides providing large modular floor pieces of deck 100, modular vehicle floor system 5 enjoys relatively few piece-parts by integrating numerous features and components into the deck 100. Such fully integrated features and components of modular vehicle floor system 5 include, but are not limited to, compartments liners 220, 222, 224, 226 and thus compartments 20, 22, 24, 26, as well as troughs 260, and ports 270. Since the openings and lid or cap engaging structures of the compartments 20, 22, 24, 26, troughs 260 and ports 270 are also integrated into the deck 100, good fitment between (i) the compartments 20, 22, 24, 26 and troughs 260 and ports 270, and (ii) respective ones of covers 240, 242, 244, 246, and elongate caps 280 is ensured. This facilitates waterproof or watertightness of the compartments 20, 22, 24, 26, troughs 260 and ports 270.

In addition to facilitating efficient assembly of a vehicle interior and watertightness, modular vehicle floor system 5, with its integrated indexing openings 170, 175, deck 100 enhances fit and finish of the fully assembled vehicle interior by providing readily discernible indexing targets for proper alignment with cooperating components.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A modular floor system for a vehicle comprising:
   a floor pan defining an underbody of a vehicle and having a plurality of recessed compartments formed therein; and
   a deck that overlies and is connected to the floor pan, the deck including:
   a plurality of openings formed therein overlying a respective one of the plurality of compartments;
   an elongate first trough formed therein;
   a vehicle wiring harness located within the first trough;
   a port formed therein that extends between the first trough and one of the deck openings; and
   an outer covering overlying the deck.

2. The modular floor system of claim 1, wherein the deck includes multiple apertures that overlie and expose seat mounting structures that are provided on an upper surface of the floor pan.

3. The modular floor system of claim 1, the deck further comprising separate left and right segments that are connected to each other.

4. The modular floor system of claim 1, wherein the outer covering comprises a layer of carpeting.

5. The modular floor system of claim 4, further comprising a cap that is removably attached to the deck and covers the first trough.

6. The modular floor system of claim 1, further comprising a second trough that extends transversely across the deck and holds a length of the vehicle wiring harness therein.

7. The modular floor system of claim 6, wherein the second trough extends across an entire width of the deck and a cap removably covers and restricts access through an opening at a top portion of the trough.

8. The modular floor system of claim 1, the deck further comprising a liner extending downwardly from a perimeter of one of the multiple openings of the deck, the liner nesting into one of the multiple compartments of the floor pan.

9. The modular floor system of claim 8, wherein the deck includes multiple liners that nest into respective multiple ones of the compartments of the floor pan.

10. The modular floor system of claim 8, further comprising a cover that removably encloses the liner.

11. The modular floor system of claim 1, wherein the trough extends longitudinally along the deck.

12. The modular floor system of claim 11, further comprising a pair of troughs that extends longitudinally along the deck, each trough being adjacent an outboard portion of the deck.

13. The modular floor system of claim 12, wherein the pair of troughs extends along substantially the entire length of the deck and have a cap removably covering each trough that is substantially coplanar of an adjacent portion of the deck inboard of the trough.

14. The modular floor system of claim 12, further comprising a third trough that extends longitudinally along a tunnel portion of the deck and formed in an upper surface of the tunnel portion of the deck.

15. The modular floor system of claim 14, wherein the tunnel portion of the deck includes at least one opening extending therethrough and that exposes an underlying tunnel portion of the floor pan.

16. The modular floor system for a vehicle comprising:
    a floor pan defining an underbody of a vehicle and having a compartment extending downwardly therefrom;
    a deck that overlies and is connected to the floor pan;
    a raceway system connecting the compartment to another, different portion of the modular floor system; and
    a flange connected to and extending from the deck.

17. A method of installing a modular floor system into a vehicle comprising:
    installing a floor pan that defines an underbody of a vehicle;
    placing a deck over the floor pan and connecting the deck thereto, wherein the deck includes a liner extending therefrom and defining a compartment therein; and
    placing a wire harness or other conductor in a raceway system that connects the compartment to another, different portion of the modular floor system.

18. The method of claim 17, wherein the floor pan includes a compartment extending downwardly therefrom and the liner nests into the compartment of the floor pan.

\* \* \* \* \*